United States Patent
Lemmon et al.

[11] Patent Number: 5,278,974
[45] Date of Patent: Jan. 11, 1994

[54] METHOD AND APPARATUS FOR THE DYNAMIC ADJUSTMENT OF DATA TRANSFER TIMING TO EQUALIZE THE BANDWIDTHS OF TWO BUSES IN A COMPUTER SYSTEM HAVING DIFFERENT BANDWIDTHS

[75] Inventors: Paul J. Lemmon, West Townsend; Raj Ramanujan, Leominster, both of Mass.; Jay C. Stickney, Derry, N.H.

[73] Assignee: Digital Equipment Corporation, Maynark, Mass.

[21] Appl. No.: 445,983

[22] Filed: Dec. 4, 1989

[51] Int. Cl.⁵ .............................................. G06F 13/14
[52] U.S. Cl. ................... 395/550; 364/239.1; 364/240.3; 364/238.4; 364/271.6; 364/939.4; 364/927.93; 364/DIG. 1; 395/425; 395/500
[58] Field of Search ............... 364/200; 395/500, 325, 395/550, 425

[56] References Cited
U.S. PATENT DOCUMENTS

| | | |
|---|---|---|
| 3,714,635 | 1/1973 | Hamilton et al. ................. 364/200 |
| 4,309,754 | 1/1982 | Dinwiddie, Jr. . |
| 4,325,118 | 4/1982 | DeVita et al. . |
| 4,378,588 | 3/1983 | Katzman et al. . |
| 4,417,303 | 11/1983 | Korowitz et al. . |
| 4,449,184 | 5/1984 | Pohlman, III et al. . |
| 4,476,527 | 10/1984 | Clayton, IV .................... 364/200 |
| 4,495,574 | 1/1985 | Hofstetter . |
| 4,499,536 | 2/1985 | Gemma et al. .................. 364/200 |
| 4,542,454 | 9/1985 | Brcich et al. ................... 364/200 |
| 4,570,220 | 2/1986 | Tetrick et al. . |
| 4,604,683 | 8/1986 | Russ et al. . |
| 4,631,659 | 12/1986 | Hayn, II et al. ................ 364/200 |
| 4,649,512 | 3/1987 | Nukiyama . |
| 4,682,285 | 7/1987 | Ozil et al. . |
| 4,792,926 | 12/1988 | Roberts ........................... 365/189 |
| 4,858,113 | 8/1989 | Saccardi .......................... 364/200 |
| 4,864,496 | 9/1989 | Triolo et al. .................... 364/200 |
| 4,866,609 | 9/1989 | Calta et al. ..................... 364/200 |
| 4,878,166 | 10/1989 | Johnson et al. ................. 364/200 |
| 4,888,684 | 12/1989 | Lilja et al. ...................... 364/200 |

*Primary Examiner*—Parshotam S. Lall
*Assistant Examiner*—Ken S. Kim
*Attorney, Agent, or Firm*—Kenyon & Kenyon

[57] ABSTRACT

The bandwidth of a first bus and a second bus, unequal due to differences in protocol overheads and cycle times between the buses, are equalized without sacrificing any bandwidth on the lower bandwidth bus and without introducing any buffering in a control logic device. The control logic device equalizes the bandwidths of the buses by instructing a device coupled to the second bus to insert a partial dead bus cycle in a read transmission thereby dynamically adjusting read timing on the second bus when the second bus is heavily loaded.

26 Claims, 7 Drawing Sheets

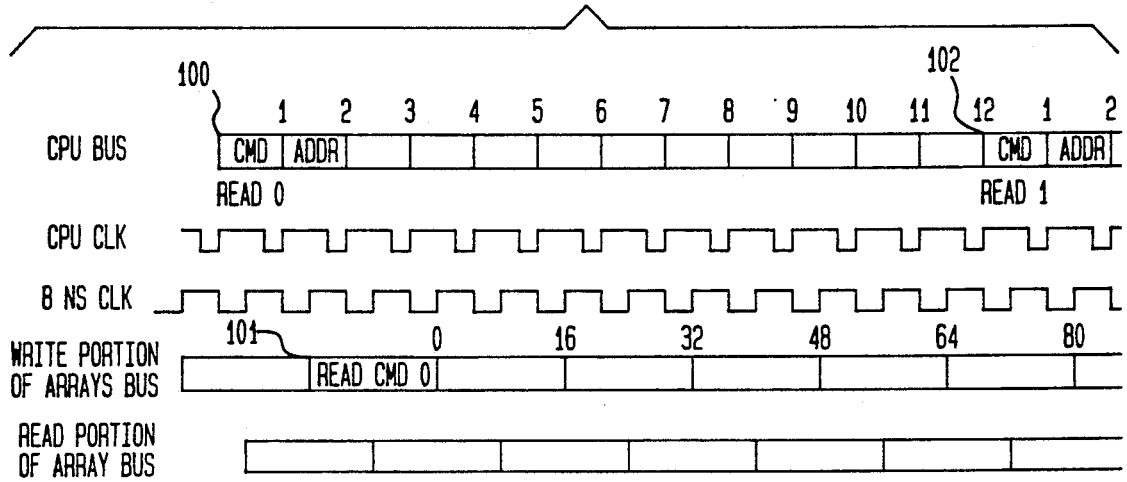
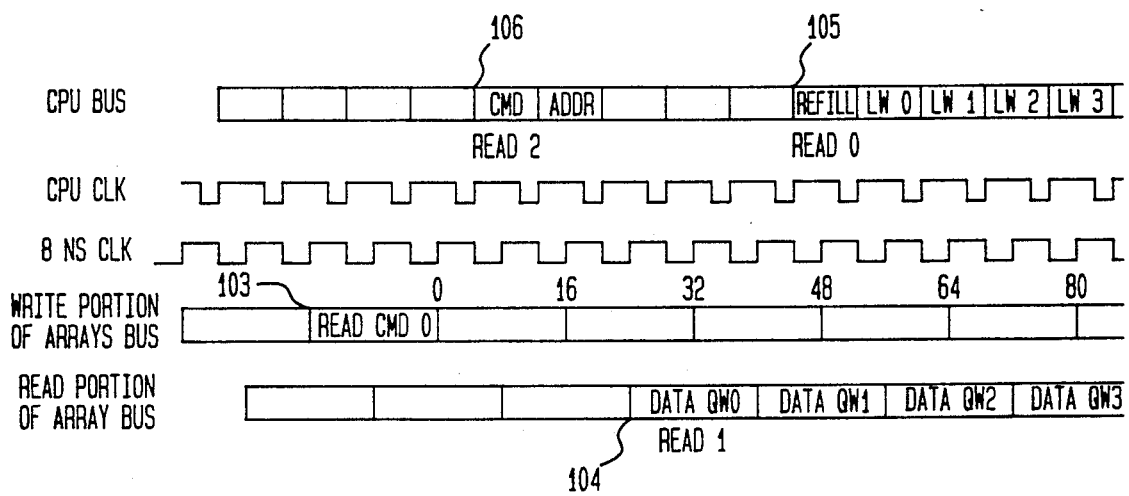
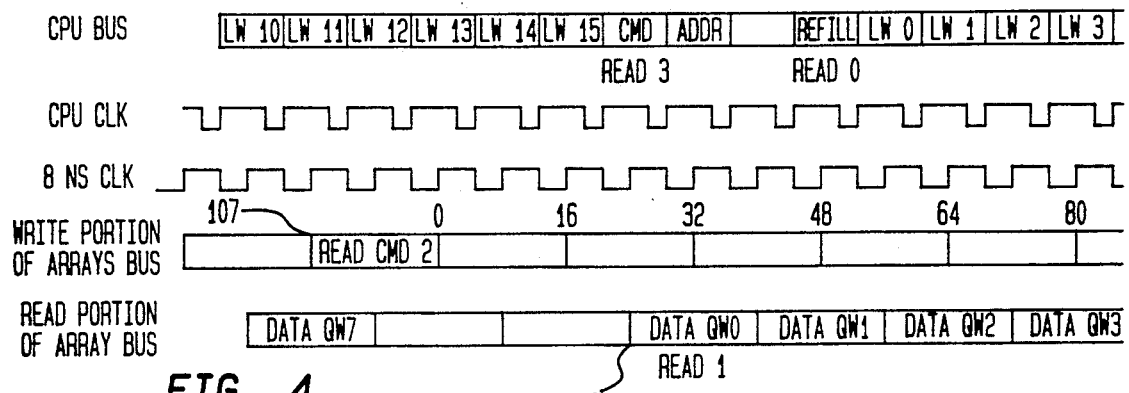
FIG. 4
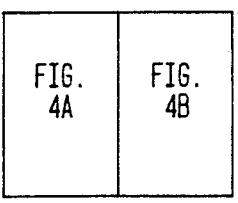

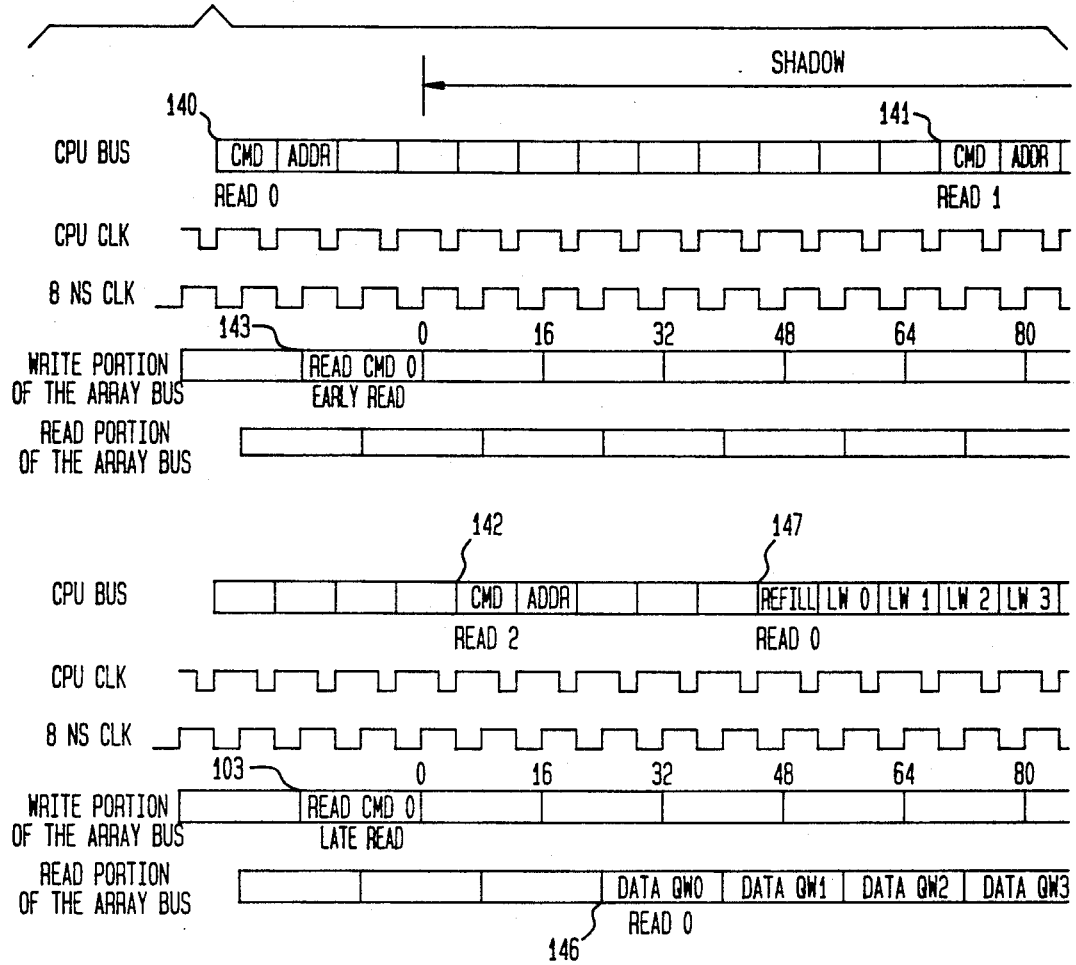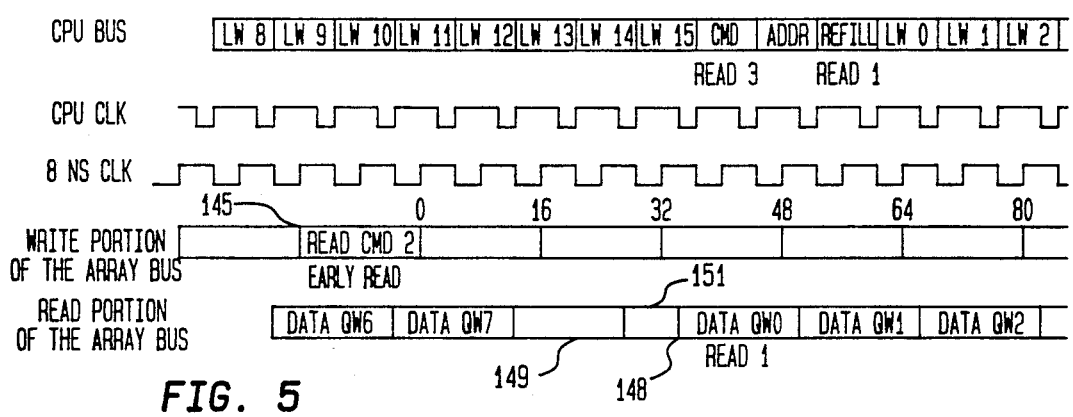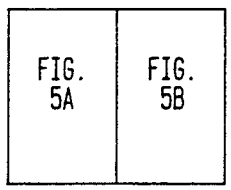

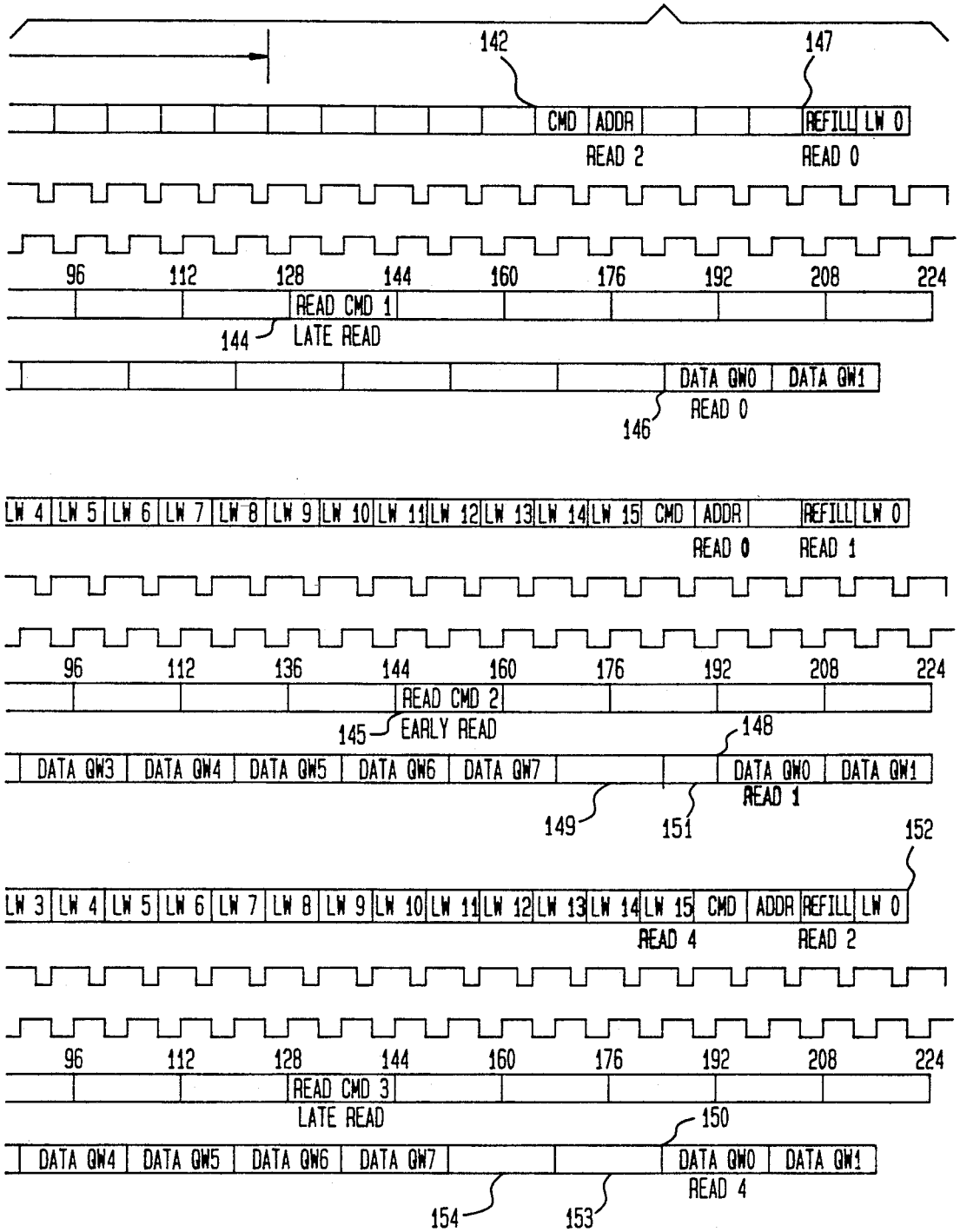

METHOD AND APPARATUS FOR THE DYNAMIC ADJUSTMENT OF DATA TRANSFER TIMING TO EQUALIZE THE BANDWIDTHS OF TWO BUSES IN A COMPUTER SYSTEM HAVING DIFFERENT BANDWIDTHS

FIELD OF THE INVENTION

This invention relates to a computer system and, more particularly, to a computer system which provides for the dynamic adjustment of memory read timing to equalize bandwidths between two buses.

BACKGROUND OF THE INVENTION

High performance computer systems typically comprise a plurality of buses to transfer data between elements in the system. For example, a central processing unit (hereinafter "CPU") may conduct data transfers to a memory array through intermediate control logic. In one configuration, there may be two bus arrangements—one which couples the CPU to the control logic and one which couples the memory array to the control logic.

In such a system, the control logic performs the function of adapting the CPU bus protocol to the memory array bus protocol. Typically, the bandwidths, i.e., the amount of data that can be transferred per unit of time on a bus, of these two buses are unequal because of differences in protocol overhead, bus configuration and cycle times between the two buses. In order to maintain efficient and accurate data transfers between the CPU and the memory array, the control logic must equalize the bandwidths of these buses.

One solution for equalizing the bandwidth of the buses proposed by the prior art is to provide some form of buffering to store data received from either the CPU or the memory array at the proper operating speed. The data stored in the buffer is transmitted to its destination at the proper operating speed. However, if such buffering is provided, additional complex logic must be added to the control logic to prevent writes to the buffer when it is full thereby preventing buffer overrun. The stopping of data transfers to empty the buffer results in degradation of bus bandwidth and system performance.

Another solution is to introduce a number of dead, i.e., inactive, bus cycles on the bus operating at a higher bandwidth to equalize the bandwidths of the buses. Such a solution, however, results in a significant loss of bandwidth on both buses since the introduction of dead cycles will typically result in the system operating at a bandwidth lower than the bandwidth of the bus with the lower bandwidth.

While the prior art provides an adequate method for equalizing the bandwidths of two buses, there is a need for advancement. In particular, in a high performance computer system, a major bottleneck to processing speed is bus transfers. Thus, it is imperative to optimize the speed of bus transfers to improve the processing speed of the system.

SUMMARY OF THE INVENTION

Accordingly, the present invention provides a method and apparatus for equalizing the bandwidth between two buses without sacrificing any bandwidth on the lower bandwidth bus and without introducing any buffering in the control logic.

Generally, the present invention comprises a first bus and a second bus. The buses are intercoupled by a control logic device. The present invention equalizes the bandwidth of the two buses by dynamically adjusting the timing of a read cycle on the second bus based upon the loading conditions of the second bus. The control logic device maintains a queue of pending reads to a plurality of devices on the second bus, thus tracking when each one of the plurality of devices requires the second bus for data transfers. Based upon the state of the second bus, the control logic device determines when to send a read command to a device.

Each read command sent to one of the plurality of devices coupled to the second bus contains information that informs the device to dynamically adjust memory read timing on the bus when transferring data to the control logic device which equalizes the bandwidth of the first bus and the second bus when the second bus is heavily loaded.

Accordingly, the present invention optimizes the data transfer rate between a first bus and a second bus without sacrificing bandwidth on the lower bandwidth bus and without introducing any buffering. The invention provides a control logic device that monitors the loading of the second bus and determines when to dynamically adjust the timing of a read cycle on the second bus.

BRIEF DESCRIPTION OF THE DRAWINGS

FIG. 5 consisting of FIGS. 5A and 5B also shows timing diagrams that illustrate the array bus and CPU bus timing.

DETAILED DESCRIPTION

Figure 1:
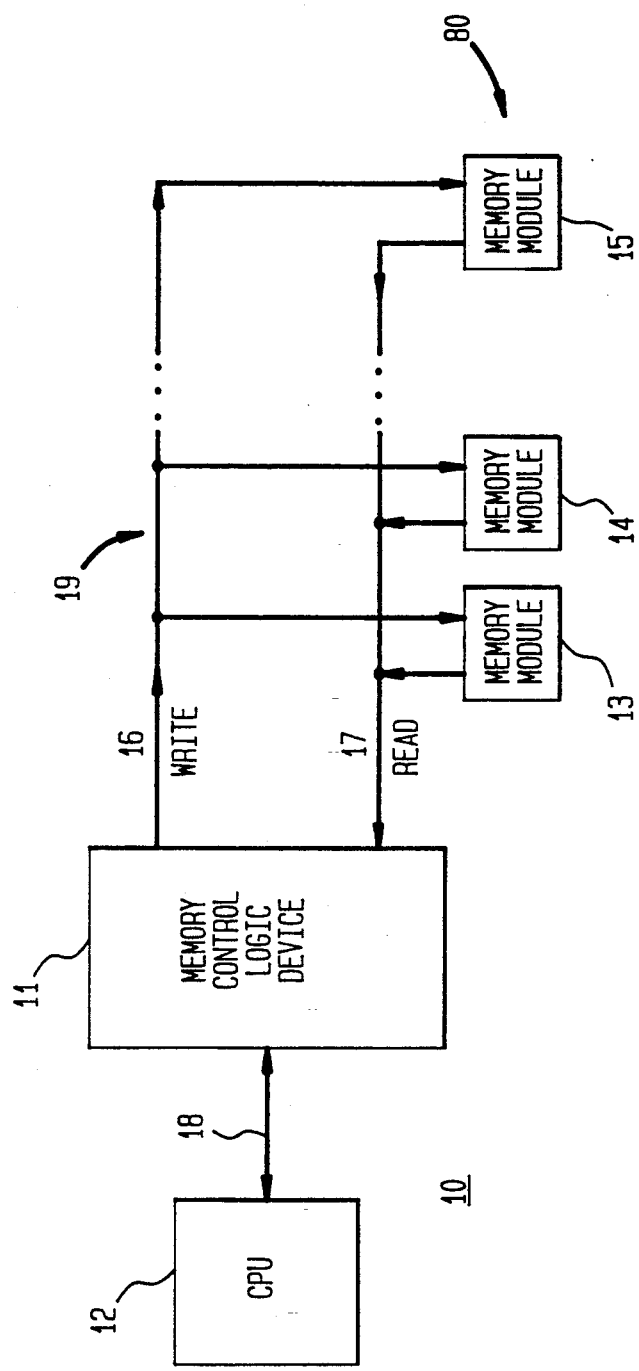
FIG. 1 is a block diagram of a system configuration according to the present invention.

Referring now to the drawings and initially to FIG. 1, there is illustrated, in block diagram form, a representative embodiment of the invention. The system 10 comprises a CPU 12, a memory control logic device 11, and a plurality of memory modules 13, 14 and 15, hereinafter collectively referred to as a memory array 80. The CPU 12 is coupled to the memory control logic device 11 by a bus 18. Each of the memory modules 13, 14 and 15 are coupled to the memory control logic device 11 by a write portion 16 and a read portion 17 of a bus arrangement hereinafter referred to as an array bus 19.

The CPU bus 18 is a 32-bit wide, point to point, bidirectional bus arrangement that has an eight nanosecond (hereinafter "ns") bus cycle time. The CPU 12 can transfer four bytes (32 bits) of data to the memory control logic device 11 every eight ns. The array bus 19 is a multidrop bus arrangement. The write portion 16 of the array bus 19 is a 32-bit wide bus that has a 16 ns bus cycle time. The read portion 17 of the array bus 19 is a 64-bit wide bus that also has a 16 ns bus cycle time. Therefore, eight bytes (64 bits) of data can be transferred from one of the memory modules 13, 14 and 15 to the memory control logic device 11 every 16 ns.

Based on the foregoing, it appears that the bandwidths of the array bus 19 and the CPU bus 18 are equal, i.e., eight bytes of data can be transferred every 16 ns. Every data transaction,, however, has some overhead associated with it to accomplish a data transfer operation. The overhead requirements on the CPU bus 18 are greater than the overhead requirements on the array bus 19 as explained below. Thus, because of the differences in the cycle times and the overhead requirements of the CPU bus 18 and the array bus 19, the bandwidths of the two buses are not equal.

For example, to transfer a block of data from one of the memory modules 13, 14 or 15 to the CPU 12 requires a total of 19 bus cycles on the CPU bus 18. The sequence of steps are (1) the CPU 12 sends a read command on the CPU bus 18 (one bus cycle), (2) the CPU 12 sends a read address on the CPU bus 18 (one bus cycle), (3) after waiting some amount of time, the memory control logic device 11 sends a refill command, i.e., indicating read data will be transferred starting the next bus cycle, on the CPU bus 18 (one bus cycle), and (4) the memory control logic device 11 transfers a 64 byte block of data to the CPU 12 (16 bus cycles). Thus, the peak read bandwidth available on the CPU bus 18 is 64 bytes every 19 CPU bus 18 cycles or 421 Mbytes/sec.

The sequence of steps for transferring data from a memory module, for example, memory module 13, on the array bus 19 to the CPU 12 are: (1) the memory control logic device 11 issues a read command/address on the write portion 16 of the array bus 19 that is recognized by memory module 13 (one bus cycle) and (2) after some amount of time, the selected memory module 13 transfers a 64 byte block of data on the read portion 17 of the array bus 19 to the memory control logic device 11 (eight bus cycles). Once the data transfer is started, the data is transferred all the way from selected memory module 13 to the CPU 12 without any intermediate buffering.

On the array bus 19 side, the read command/address cycle can be sent during a previous memory look up since such request is sent on the write portion 16 of the array bus 19 and does not affect the read portion 17 of the array bus 19. Thus, the peak bandwidth of array bus 19 does not take into account the read command and, in theory, would be 64 bytes of data every eight bus cycles. The nature of the array bus 19 as a multidrop bus in the representative embodiment, however, requires that one dead bus cycle, i.e., no activity for 16 ns, be inserted between data transfers on the array bus 19 from the memory modules 13, 14 and 15, to prevent bus contention between memory modules. Therefore, the peak bandwidth of the array bus 19 is 64 bytes every nine bus cycles or 444 Mbytes/sec.

In order to facilitate accurate data transfers from one of the memory modules 13, 14 and 15 to the CPU 12, the bandwidths of the respective buses are equalized. The present invention achieves this equalization between the two buses without reducing the bandwidth of the array bus 19 below the bandwidth of the CPU bus 18 and without introducing buffering and complicated control mechanisms in the memory control logic device 11 to start approaching the maximum achievable array bus 19 bandwidth of 421 Mbytes/sec. Instead, the present invention provides for the dynamic adjustment of the memory read timing on the array bus 19 to equalize the bandwidths of the CPU bus 18 and the array bus 19.

The dynamic positioning of the refill timing on the array bus 19 is controlled by the memory control logic device 11. The memory control logic device 11 controls memory read timing on the array bus 19 through the use of two array bus 19 read commands, a read early and a read late. A read early command indicates to the selected memory module to send the refill data as soon as possible, i.e., immediately after the 16 ns dead cycle on the array bus 19. A read late command requires the selected memory module to delay the transmission of refill data by adding an additional eight ns dead cycle after the 16 ns dead cycle on the array bus 19. The combination of these two commands is used to achieve maximum bus utilization as described later.

Figure 2:
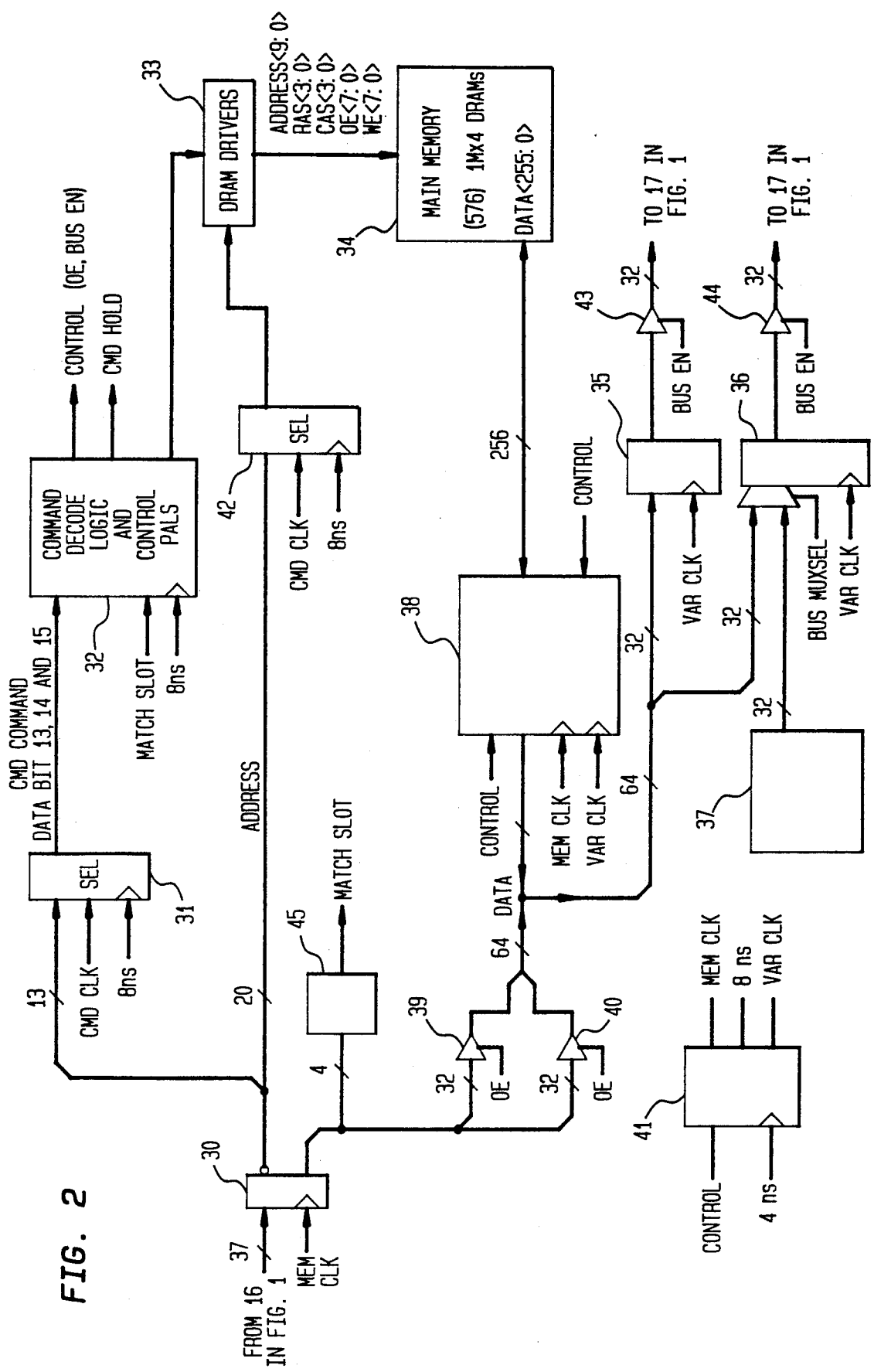
FIG. 2 is a block diagram of a memory module.

Referring now to FIG. 2, there is illustrated, in block diagram form, one of the memory modules 13-15.

Each of the memory modules 13-15 comprises a 37-bit wide latch 30, two 32-bit wide latches 35 and 36, a 20-bit wide address latch 42, a 13-bit wide command latch 31, a match slot comparator 45, command decode logic and control PALs 32, DRAM drivers 33, main memory 34, a transceiver flip flop 38, a divide by four circuit 41, a configuration register 37 and four drivers 39, 40, 43 and 44. The main memory array is a 1M×4 dynamic random access memory (hereinafter "DRAM") array. Data/address/command information is received from the write portion 16 of the array bus 19 which is coupled to the inputs of the latch 30. Data is output to the read portion 17 of the array bus 19 through the output data latches 35 and 36.

Outputs of the latch 30 are coupled to inputs of the command latch 31, the address latch 42, the match slot comparator 45 and the drivers 39 and 40. Outputs of the command latch 31 are coupled to inputs of the command decode logic and control PALs 32. The command decode logic and control PALs 32 decode the command received from the memory control logic device 11 and generate the proper control signals for the main memory 34, the transceiver flip flop 38, the command latch 31, the address latch 42, the divide by four circuit 41, as well as output enable ("OE") and bus enable ("BUS EN") signals which are utilized throughout the module. Outputs of the command decode logic and control PALs 32 are coupled to inputs of the DRAM drivers 33, the transceiver flip flop 38, the divide by four circuit 41, the command latch 31 and the address latch 42. The output of the address latch 42 is coupled to inputs of the DRAM drivers 33.

The data received from the write portion 16 of the array bus 19 is output by latch 30 and coupled to the two 32-bit wide drivers 39 and 40, the match slot comparator 45 and a 13-bit wide command latch 31. The drivers 39 and 40 are tristate devices whose output is coupled to a bidirectional data path that couples the transceiver flip-flop 38 and output data latches 35 and 36. The drivers 39 and 40 are tristated by the OE signal when the transceiver flip flop 38 is transferring data to the output data latches 35 and 36. The transceiver flip-flop 38 is also coupled by a bidirectional data path to the data inputs/outputs of the main memory 34. Data is written to and read from the main memory 34 through the transceiver flip-flop 38. Data read from the main memory 34 is passed through the transceiver flip-flop 38 and output to the read portion 17 of the array bus 19 through the output data latches 35 and 36 and through drivers 43 and 44. The DRAM drivers 33 are coupled to the address and control inputs of the main memory 34.

The data input of the output data latch 36 is multiplexed between memory data and the output of the configuration register 37. The configuration register 37 contains information that is used by the CPU 12 to determine the memory module type of a particular memory module. This information is accessed by the CPU 12 during system initialization and is used to ascertain information specific to the memory module, e.g., the memory size of the main memory 34, the module identification number, and the read and write latency time periods of the main memory 34 for a particular memory module. This information is stored in a register in the memory control logic device 11, and used as is described later.

The outputs of the output data latch 35 and 36 are coupled to tristate drivers 43 and 44. The outputs of these drivers 43 and 44 are coupled to the read portion 17 of the array bus 19. A four ns system clock is coupled to the divide by four circuit 41. The outputs of the divide by four circuit 41 provide an eight ns clock, a MEMCLK, i.e., a 16 ns clock, and a variable clock. The eight ns clock is coupled to command latch 31, the command decode logic and control PALs 32 and the address latch 42. The MEMCLK signal is coupled to the latch 30 and the transceiver flip flop 38. The variable clock is coupled to the transceiver flip-flop 38 and the output data latches 35 and 36. The variable clock is controlled by control signals from the command decode logic and control PALs 32. If a read early command is decoded, the variable clock is a 16 ns clock. If a read late command is decoded, the variable clock is a 16 ns clock that is shifted by one-half phase, i.e., eight ns.

Figure 3:
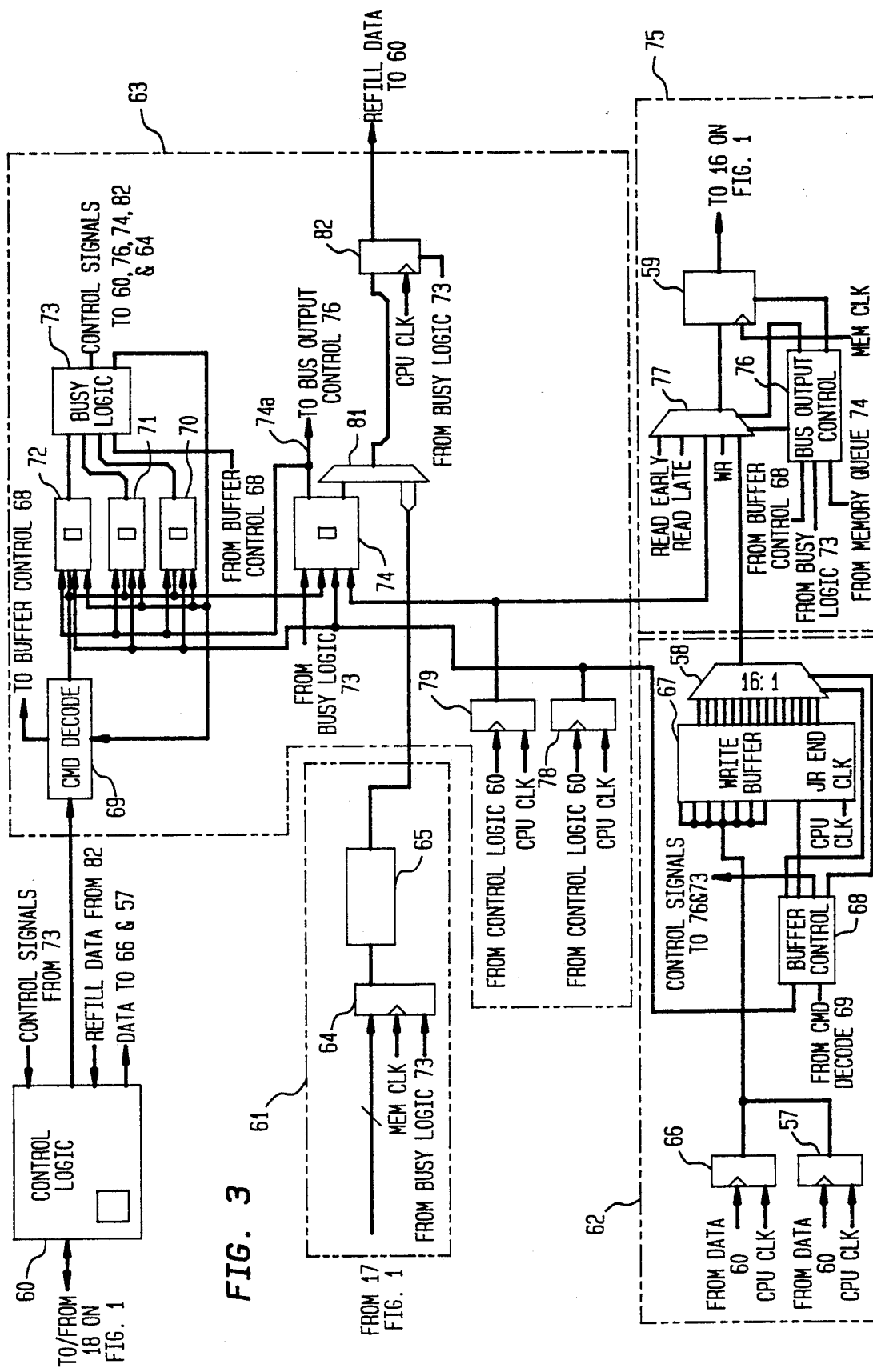
FIG. 3 is a block diagram of a memory control logic device.

Referring now to FIG. 3, there is illustrated in block diagram form, the memory control logic device 11. The memory control logic device 11 comprises a control logic device 60, a memory read data path 61, a memory write data path 62, a memory controller 63 and an array bus write interface 75. The control logic device 60 provides the interface to the CPU bus 18 for the memory control logic device 11. Commands and data are received from and sent to the CPU 12 via the control logic device 60. The memory read data path 61 is the interface between the memory control logic device 11 and the read portion 17 of the array bus 19. It is through this path 61 that refill data is received from a selected memory module 13, 14 and 15 of the memory array B0. The memory write data path 62 provides a path for data received from the CPU 12 to be buffered and then transmitted to the memory array B0. The array bus write interface 75 is the interface to the write portion 16 of the array bus 19. It is through this path 75 that commands and data are sent to the memory array 80 from the memory control logic device 11. The memory controller 63 provides intelligence to the memory control logic device 11 by decoding commands received from the CPU 12, sending the commands to a selected memory module in the memory array 80 and monitoring the activities of the array bus 19. It is this logic block which controls the dynamic positioning of the refill timing on the array bus 19.

The memory read data path 61 comprises a 64-bit wide latch 64 and an error detection and correction logic device 65. Inputs of the latch 64 are coupled to the read portion 17 of the array bus 19. Outputs of the latch 64 are coupled to inputs of the error detection and correction logic device 65. Outputs of the error detection and correction logic device 65 are coupled to a multiplexer 81 in the memory controller 63. The latch 64 captures the data as it is received from the read portion 17 of the array bus 19. The data is passed through the error detection and correction detection logic device 65 where an integrity check is performed. The data is then transmitted to the memory controller 63 for transmission to the CPU 12.

The memory write data path 62 comprises two 32-bit wide latches 66 and 57, an 8×64 bit wide write buffer 67, buffer control logic 68 and a multiplexer 58. Inputs to the latches 66 and 57 are coupled to data outputs of the control logic device 60. Outputs of the latches 66 and 57 are coupled to inputs of the write buffer 67. Outputs of the write buffer 67 are coupled to the array bus write interface 75 through the multiplexer 58. The multiplexer 58 is a 16 to 1 multiplexer that is controlled by the buffer control logic 68. While data is stored in eight 64 bit entries in the write buffer 67, data is transmitted in 16 long words, i.e., 32 bits per transfer. Outputs of the buffer control logic 68 are coupled to busy logic 73 in the memory controller 63, write buffer 67 and the multiplexer 58. Outputs of a command decoder 69 and a latch 78 in the memory controller 63 are coupled to inputs of the buffer control logic 68. The buffer control logic 68 is controlled by the memory controller 63. The buffer control logic 68 controls the loading and unloading of the write buffer 67. Data passed to the memory control logic device 11 from the CPU 12 is captured by the latches 66 and 57 and then stored in the write buffer 67 under the control of the buffer control logic 68. The buffer control logic 68 sequentially selects one of the 16 inputs of the multiplexer 58 to pass one 32-bit entry per array bus 19 cycle time to the array bus write interface 75 during a write operation.

The memory controller 63 comprises a command decoder 69, three state machines 70, 71 and 72, busy logic 73, a memory queue 74, a multiplexer 81 and three latches 78, 79 and 82. Inputs of the command decoder 69 are coupled to outputs of the control logic device 60. The command decoder 69 receives commands passed from the CPU 12 and determines the type of command received. If a write command is decoded, the command decoder 69 generates a BUFFER WR signal to the buffer control logic 68 to enable the write buffer 67 to capture write data. Outputs of the command decoder 69 are coupled to inputs of the state machines 70, 71 and 72, the buffer control logic 68 and memory queue 74.

The CPU command is passed from the command decoder 69 to whichever one of the state machines 70, 71 and 72 is available. Outputs of the state machines 70, 71 and 72 and the buffer control logic 68 are coupled to inputs of the busy logic 73. The busy logic 73 interprets the outputs of the state machines 70, 71 and 72 and the buffer control logic 68 to determine the current state of the memory controller 63, the array bus 19 and the memory modules 13, 14 and 15. This state is then fed back to the command decoder 69, the control logic device 60, and the state machines 70, 71 and 72. This information is utilized by the control logic device 60 to prevent the passing of commands to the command decoder 69 when all the state machines 70, 71 and 72 are busy. The information also indicates when commands can be sent and which of the memory modules 13, 14 and 15 are available. An output of the busy logic 73 is also coupled to the bus output control logic 76 to control the selection of a read or write command and to the latches 64 and 82 to enable the latches 64 and 82 to accept data destined for the CPU bus 18.

Outputs of the latch 78 are coupled to the memory queue 74, the buffer control logic 68 and the state machines 70, 71 and 72. Inputs of the latch 78 are coupled to the control logic device 60. It is through this latch 78 that the control logic device 60 passes information to the memory queue 74 and state machines 70, 71 and 72 relevant to commands passed to the memory controller 63. This information comprises the memory module identification number of the selected memory module and the read or write latency time for the selected memory module. The CPU 12 stores this information in a register in the control logic device 60 at system initialization after reading the configuration register 37 of each one of the memory modules 13-15.

Outputs of the control logic device 60 are coupled to inputs of the latch 79. Outputs of the latch 79 are coupled to inputs of the memory queue 74 and multiplexer 77. The latch 79 receives address information from the control logic device 60 and passes the same to the memory queue 74 and multiplexer 77.

Outputs of the memory queue 74 and the error detection and correction logic device 65 are coupled to inputs of the multiplexer 81. Outputs of the multiplexer 81 are coupled to inputs of the latch 82. Outputs of latch 82 are coupled to the control logic device 60. It is through this path that refill data received from one of the memory modules 13, 14 and 15 is passed from the read portion 17 of the array bus 19 to the control logic device 60 for transmission on the CPU bus 18.

Each of the state machines 70, 71 and 72 has a programmable counter associated with it. This counter is programmed by the state machines 70, 71 and 72 through the busy logic 73 to generate a timing signal that is used by the state machines 70, 71 and 72 to track certain time periods. For example, the counter tracks the read latency of a selected memory module and the number of cycles required to transfer refill data on the CPU bus 18.

The memory queue 74 is coupled to receive inputs from the control logic device 60 through the latches 78 and 79, to provide outputs to each of the state machines 70, 71 and 72, to bus output control logic 76 of the array bus write interface 75 and to the multiplexer 81. One entry per state machine is maintained in the memory queue 74. Each time a command is passed from the control logic device 60, the information comprising the entries is also passed by the control logic device 60 through the latches 78 and 79 and stored in the memory queue 74 by one of the state machines 70, 71 and 72. The entry comprises the 32-bit memory address being accessed, an identification field which represents the memory module of the memory array 80 being accessed, a write access time field and a read access time field. The write access and read access time fields represent the memory latency for reads and writes, respectively, for the main memory 34 of the selected memory module being accessed. This information is used by the memory controller 63 to control the array bus 19 timing of both memory reads and writes.

The memory queue 74 also has a programmable counter. This counter is programmed by the memory queue 74 pursuant to the read access time passed to the memory queue 74 by the control logic device 60 through the latch 78. The counter is enabled by the state machines 70, 71 and 72 through the busy logic 73 when a read command is processed. This counter generates a timing signal that is used by the state machines 70, 71 and 72 to indicate that the value of the count that was loaded in the memory queue counter to account for the read latency of a selected memory module has expired.

The memory queue 74 generates a signal on line 74a, SEND READ EARLY, that is coupled to the memory queue 74 counter, the state machine 70, 71 and 72, and to bus output control logic 76 of the array bus write interface 75. This signal controls the selection of either a read early or a read late command as is described later.

The array bus write interface 75 provides the path by which data, address and commands are sent to the memory array 80. The multiplexer 58 of the memory write data path 62 and the latch 78 are coupled to a multiplexer 77. Also coupled to the multiplexer 77 are three hardwired inputs representative of array bus 19 commands, READ EARLY, READ LATE and WR, that are selected as is described later. An output of the multiplexer 77 is coupled to a latch 59. The memory module identification number is transmitted from control logic device 60 through the latch 78 to an input of the multiplexer 77. The output of the latch 59 is coupled to the write portion 16 of the array bus 19.

The latch 59 and the multiplexer 77 are controlled by bus output control logic 76. The state machines 70, 71 and 72, through the busy logic 73, the memory queue 74 and the buffer control logic 68 are coupled to inputs of the bus output control logic 76. The bus output control logic 76 selects the proper multiplexer input to pass the proper hardwired command, address or data to the write portion 16 of the array bus 19 as a function of the information received from the state machines 70, 71 and 72 and the SEND READ EARLY signal on line 74a from the memory queue 74.

A CPU CLK signal is coupled to the write buffer 67 and latches 66, 57, 82, 78 and 79. The CPU CLK is a free running eight ns clock. The MEM CLK signal, a 16 ns clock derived from an eight ns clock, is coupled to the latches 64 and 59.

There are fifteen valid input signals to the state machines 70, 71 and 72. A valid command ("VLD CMD") signal is an output from the command decoder 69 to each of the state machines 70, 71 and 72. The VLD CMD signal starts an execution cycle for a state machine. Read and write ("RD" and "WR") signals are also output by the command decoder 69 to the state machines 70, 71 and 72. These signals are asserted with the VLD CMD signal to direct one of the state machines 70, 71 and 72 to perform a read or write operation. A command pending ("CMD PENDING") signal is output by the busy logic 73 to inform the state machines 70, 71 and 72 that the array bus 19 is busy, therefore, the selected state machine must wait. This signal is generated by logically ORing certain outputs of the state machines 70, 71 and 72 that are described below and the signal generated by the buffer control logic 68 and sent to the busy logic 73 that indicates a write is in progress. An overflow ("OVF") signal is an output of the counter associated with each one of the state machines 70, 71 and 72 that provides a means for establishing specific time delays as will be explained below. An abort ("ABORT") signal is output by the control logic device 60 to indicate an error condition has occurred, and as such, stops the state machines 70, 71 and 72 from sending data back to the CPU 12. A state machine initialization ("SM INIT") signal is an output of the CPU 12 that provides a power on reset signal to initialize each of the state machines 70, 71 and 72. A memory busy ("MEM BSY") signal is an output of the busy logic 73 that is coupled to each of the state machines 70, 71 and 72 to indicate that a selected memory module is busy. STATE <6>-<0> signals are output by the individual state machines to direct a state machine to enter a new state.

Each one of the state machines 70, 71 and 72 generates nineteen output signals that are utilized either by the state machines 70, 71 and 72 or by other logic within the memory control logic device 11. A set read busy ("SET RD BSY") signal, output to the busy logic 73 to indicate that a read is in progress is the signal ORed with the signal output by buffer control logic 68 to generate the CMD PENDING signal. This signal is available to the other state machines along with the identification number of the selected memory module to indicate that a particular memory module is busy. A set write busy ("SET WR BSY") signal is also output to the busy logic 73 to perform the same functions for a write cycle as the SET RD BUSY signal does for a read cycle. A clear valid ("CLR VLD") signal is output to the busy logic 73 and issued to clear the memory queue 74 entry for the particular state machine when the state machine has completed its task. A refill ("REFILL") signal is coupled to the counters associated with the state machines 70, 71 and 72 to load the state machine counters with the proper value to count 17 CPU bus 18 cycles to establish the refill time delay and also outputs the refill command on the CPU bus 18.

A next read valid ("NEXT RD VLD") signal is coupled to the programmable counter in the memory queue 74 to inform the memory queue 74 that another read is ready to be issued. If the counter is busy, i.e., the command has been received while another read is in progress, the SEND READ EARLY signal is toggled, thus insuring that the transmitted read commands are toggled, i.e., read late to read early or read early to read late. The state machines 70, 71 and 72 do not know the type of read command issued. The state machines 70, 71 and 72 just pass read commands to the bus output control logic 76. The SEND READ EARLY signal controls the selection of the read command.

An array bus read ("ARRAY BUS RD") and an array bus write ("ARRAY BUS WR") signal is sent by the current state machine through the busy logic 73 to the bus output control logic 76 to indicate the command to issue and also start the programmable counter in the memory queue 74 and the state machine counter. A disabled abort ("DIS ABORT") signal is fed back to the state machines 70, 71 and 72 to instruct the state machines 70, 71 and 72 to ignore the ABORT signal during certain states because it is not valid.

A CPU bus request ("CPU BUS REQ") signal is coupled to the control logic device 60 to inform it that refill data will be output by the latch 82. This signal is output three CPU bus 18 cycles before refill data is put on the CPU bus 18. A queue busy ("QUEUE BSY") signal is among the control signals output by the busy logic 73 to the control logic device 60 that prevents the control logic device 60 from sending commands to the state machines 70, 71 and 72 when they are busy. A set read pending ("SET RD PENDING") signal is an output of the busy logic 73 that is fed back to the control logic device 60 to inform the device that refill data is coming, therefore, the CPU bus 18 must be available. This signal is a function of the state machine counter. It is issued prior to the time when a refill command is output. A memory recovery ("MEM RECOVERY") signal is coupled to the state machine counters. This signal sets the state machine counters to count for a preselected number of array bus 19 cycles to allow the selected memory module to recover from the current data transfer operation. GO TO <6>–GO TO <0> signals are output by a state machine which directs the current execution state of the state machine.

Set forth below, in pseudo code format, is the operation of the state machines 70, 71 and 72. Each state machine independently sequences through these states by receiving and generating its own set of input and output signals.

```
If (STATE<0>) then begin;
    DIS ABORT;
    If (VLD CMD) then begin;
        If (RD) then begin,
            SET RD BSY;
            SET RD PENDING;
            If ( NOT CMD PENDING) then begin;
                ARRAY BUS RD;
                GO TO <1>;
            end;
            else begin;
                QUEUE BSY;
                GO TO <3>;
            end;
        end;
        If (WR) then begin;
            SET WR BSY;
            If ( NOT MEM BSY) then begin;
                ARRAY BUS WR;
                GO TO <4>;
            end;
            else begin;
                QUEUE BSY;
                GO TO <5>;
            end;
        end;
    end;
    else GO TO <0>
end;
If (STATE<1>) then begin;
    SET RD BSY;
    SET RD PENDING;
    If (OVF) then begin;
        REFILL;
        DIS ABORT;
        If ( NOT ABORT) then CPU BUS REQ;
        GO TO <2>;
    end;
    else GO TO <1>;
end;
If (STATE<2>) then begin;
    DIS ABORT;
    SET RD BSY;
    If ( NOT ABORT) then begin;
        CPU BUS REQ;
        SET RD PENDING;
    end;
    If (OVF) then begin;
        MEM RECOVERY;
        GO TO <6>;
    end;
    else GO TO <2>;
end;
If (STATE<3>) then begin;
    If (ABORT) then begin;
        DIS ABORT;
        CLR VLD;
        GO TO <0>;
    end;
    else begin;
        SET RD PENDING;
        SET RD BSY;
        If ( NOT CMD PENDING) then begin;
            DIS ABORT
            ARRAY BUS RD;
            GO TO <1>;
        end;
        else begin;
            NEXT RD VLD;
            QUEUE BSY;
            GO TO <3>;
        end;
    end;
end;
IF (STATE<4>) then begin;
    DIS ABORT;
    If (OVF) then GO TO <0>;
    else begin;
        SET WR BSY;
        GO TO <4>;
```

```
        end;
    end;
    If (STATE<5>) then begin;
        SET WR BSY;
        If ( NOT MEM BSY) then begin;
            ARRAY BUS WR;
            GO TO <4>;
        end;
        else begin;
            QUEUE BSY;
            GO TO <5>;
        end;
    end;
    If (STATE <6>) then begin;
        If (OVF) then begin;
            CLR VLD;
            GO TO <0>;
        end;
        else begin;
            SET RD BSY;
            GO TO <6>;
        end;
    end;
    If (SM INIT) then begin;
        CLR VLD;
        GO TO <0>;
    end;
```

As set forth above, the state machines 70, 71 and 72 operate in six individual states. State 0 is the idle state where a state machine loops continuously until a command is received. State 1 is the state in which a state machine enters when a read command is processed. State 2 is the state where a state machine monitors the receiving of refill data from the array bus 19 and then transmits the refill data to the CPU bus 18. State 3 is entered by a state machine when a read command has been received but there is a command pending, i.e., the command was received while another read command or a write command is in progress, so the state machine must wait. State 4 is the state entered by a state machine when a write command is processed. State 5 is the state entered by a state machine when a write command is to be processed, but the selected memory module is busy. The state machine must wait until the memory module is available. State 6 is the state that the state machine enters to allow the selected memory module to finish the previous command before allowing another command to be issued. It is essentially to insure the memory module has finished the command before a new command is issued.

Each of the state machines 70, 71 and 72 starts in an idle state, i.e., state 0. The first step that a state machine, e.g., state machine 70 performs in state 0 is to disable the ABORT signal because abort is not valid in state 0. In state 0, the state machine 70 is looking for a VLD CMD signal to start processing. If no VLD CMD signal was received, the state machine 70 would continue to loop in state 0 until a VLD CMD signal is received.

Upon receiving a VLD CMD signal, the state machine 70 tests for the particular type of command received. If a read is received, the SET RD BSY and the SET RD PENDING signals are set. The state machine 70 then examines to see if the CMD PENDING signal is set, i.e., this read command has been received while another read or write command is in progress. If the CMD PENDING signal is not asserted, the state machine 70 will process the read by generating an ARRAY BUS RD signal and then entering state 1.

If the CMD PENDING signal is set, the state machine 70 asserts a QUEUE BSY signal to prevent the control logic device 60 from sending more commands. The state machine 70 then enters state 3 to wait for the CMD PENDING signal to be deasserted.

If a WR command is received with the VLD CMD signal, the SET WR BSY signal is set. The state machine 70 determines if the selected memory module is busy by testing the MEM BSY signal. If the MEM BSY signal is not asserted, the memory module is not busy. The state machine 70 then generates an ARRAY BUS WR signal which causes the bus output control logic 76 to select a write command to be issued on the write portion 16 of the array bus 19. The state machine counter is also programmed to count for the write latency time of the selected memory module. The write buffer 67 is also unloaded at this time and data is transmitted on the write portion 16 of the array bus 19, and then the state machine 70 enters state 4. If a selected memory module was busy, the state machine 70 would assert the QUEUE BSY signal to perform the same function that the QUEUE BSY signal performed for a read command, however, the state machine 70 would enter state 5 to wait for the QUEUE BUSY signal to be deasserted.

State 1 sets up the read command and puts the state machine 70 into the proper flow to accomplish a read. The state machine counter is loaded with a value representative of the memory read latency time of the selected memory module when the read signal is generated. The state machine 70 asserts the SET RD BSY and the SET RD PENDING signals and then loops in state 1 until the OVF signal is received from the state machine counter indicating that the memory read time has elapsed. When this read time OVF signal is generated, the busy logic 73 turns on latch 64 to capture the data from the read portion 17 of the array bus 19 and informs the control logic device 60 that it will need the CPU bus 18 in two cycles to transmit the refill data by transmitting a CPU BUS REQ signal. If an ABORT signal is detected, the data is not sent. A REFILL signal starts the state machine counter for counting 17 CPU bus 18 cycles, the number of cycles required to transfer 64 bytes of data to the CPU 12. The CPU BUS REQ signal is the signal that puts the refill command on the bus. This CPU BUS REQ signal must be asserted during the entire refill sequence.

State 2 is the state entered into by the state machine 70 from state 1 where the refill data is being transmitted to the CPU bus 18. The state machine 70 stays here until the state machine counter overflows, i.e., the entire 17 CPU bus 18 cycles time period loaded in state 1 have expired indicating that the refill is complete. At this point, the MEM RECOVERY signal is asserted and the state machine 70 enters state 6.

As discussed above, the state machine 70 enters state 3 when a read command has been received but the CMD PENDING signal is asserted, i.e., the command was received while another read is in progress. If no ABORT signal has been received, the state machine 70 asserts the SET RD PENDING signal and the SET RD BSY signal and continues to loop waiting for the CMD PENDING signal to be deasserted. If the CMD PENDING signal has not been deasserted, the state machine 70 generates the NXT RD VLD signal which toggles the state of the SEND READ EARLY signal, generates the QUEUE BSY signal and continues to loop in state 3. When the CMD PENDING signal is deasserted, the ABORT signal is disabled because it is not valid and the ARRAY BUS RD signal is set. The state machine 70 then enters state 1 to initiate the read procedure. The ARRAY BUS RD signal is passed to the bus output control logic 76 and is used in combination with the SEND READ EARLY signal output by the memory queue 74 to select a read early command when the SEND READ EARLY signal is asserted or a read late command when the SEND READ EARLY signal is not asserted to be transmitted on the write portion 16 of the array bus 19.

State 4 is similar to state 2 for write operations. The state machine 70 has entered state 4 from state 0 pursuant to issuing an ARRAY BUS WR signal. The state machine 70 waits here for the OVF signal to be asserted indicating that the write count loaded in the state machine counter has overflowed, i.e., it is waiting for the selected memory module to complete the write command. If the OVF signal is not asserted, the state machine 70 asserts SET WR BSY and loops in state 4 until the write is completed.

State 5 is the state entered from state 0 when a write command has been received but the selected memory module is busy. While the MEM BSY signal is asserted, data coming from the CPU 12 is loaded into the write buffer 67. This data, however, cannot be output to the write portion 16 of the array bus 19 because the selected memory module is busy. The state machine 70 first sets the SET WR BUSY signal and then loops in state 5 until the MEM BSY signal is deasserted. During looping, the QUEUE BSY signal is asserted. When the MEM BSY signal is deasserted, the state machine 70 generates the ARRAY BUS WR signal and enters state 4 to perform the write operation.

State 6 is the state entered by the state machine 70 when a command is finished. The purpose of state 6 is to allow the selected memory module to complete the command performed before a new command is sent. Therefore, if the OVF signal is set, the state machine 70 asserts the CLR VLD signal and then enters state 0 to return to an idle state. If upon entering state 6 the OVF signal is not set, the state machine 70 asserts the SET RD BSY signal and loops in state 6 until the OVF signal is detected.

During a read operation on the memory module side, a memory module must determine if it is the selected memory module by decoding signals transmitted from the memory control logic device 11. The signals received from the memory control logic device 11 by latch 30 comprise 37 bits of information. This information comprises 32 data bits, a command/data bit, and four error correcting code (hereinafter "ECC") bits. The command/data bit indicates the type of data received by a memory module. If the command/data bit equals zero, the information on the write portion 16 of the array bus 19 comprises a command. If the command/data bit equals one, the information on the write portion 16 of the array bus 19 comprises data.

During a command cycle, the ECC bits comprise the slot number of the selected memory module. The ECC bits are coupled through the latch 30 to the comparator 45. Comparator 45 generates a MATCH SLOT signal when the slot number of the command equals the slot number of the memory module. The MATCH SLOT signal is coupled to the command decode logic and control PALs 32. The command decode logic and control PALs 32 generates a CMD HOLD signal pursuant to receiving the MATCH SLOT signal and the command/data bit not being asserted. The CMD HOLD signal, coupled to latches 31 and 42, prevents the latches 31 and 42 from changing the data at their outputs during the subsequent array bus 19 cycles thereby preserving the command in latch 31 and the address in latch 42.

Upon generating the CMD HOLD signal, the command decode logic and control PALs 32, whose logic state changes with every subsequent array bus 19 cycle, enters state one. The PALs in the command decode logic and control PALs 32 examine the state and generate the appropriate signals.

For a memory read cycle, each one of the memory modules 13, 14 and 15 latch the data into the latch 30. The output of latch 30 is then loaded into the latches 31 and 42 eight ns later pursuant to the eight ns clock generated by the divide by four logic 41. The output of latch 30 is also captured by the match slot comparator 45. One of the memory modules 13, 14 and 15, e.g., 14, will decode the ECC bits, determine that the command is for memory module 14 and generate the MATCH SLOT signal. The CMD HOLD signal is generated by the command decode logic and control PALs 32 pursuant to the MATCH SLOT signal and the nonassertion of the command/address bit at the beginning of the next array bus 19 cycle which is 8 ns later. The CMD HOLD signal freezes the command in latch 31 and the address in latch 42. The command is decoded and a read command is detected.

Upon generating the CMD HOLD signal, the command decode logic and control PALs 32, whose state changes every subsequent array bus 19 cycle, enters state one and generates a row address strobe (hereinafter "RAS") control signal. This control signal is input to the main memory 34 through the DRAM drivers 33. The RAS control signal stays asserted for the entire memory read cycle. The command decode logic and control PALs 32 clock through states two to five without any activity on the memory module 14 because no data is being transferred on the memory module 14. These inactive states are required to allow for the RAS access time. The DRAMs comprising the main memory 34 require locations to be accessed by row and column. Thus, the RAS control signal is asserted to allow the row address to be taken into the DRAMs. The column address strobe (hereinafter "CAS") control signal is then asserted by the command decode logic and control PALs 32 in state six to strobe the column address into the DRAMs. The command decode logic and control PALs 32 clock through states seven to nine without any activity on the memory module 14.

The data from the addressed location in the main memory 34 becomes available during state ten on the output of the main memory 34 which is coupled to the transceiver flip flop 38. The first data block consisting of 256 bits (64 bytes) is latched into the transceiver flip flop 38 under the control of a control signal generated by the command decode logic and control PALs 32. At the same time, the CAS control signal is deasserted which tristates the main memory 34. The CAS control signal is then reasserted to strobe the column address for the next 256 data bits to have the data from those locations become available.

Before the second data block can be read from the main memory 34, the first data block must be transferred out of the transceiver flip flop 38 to the read portion 17 of the array bus 19. The data block is transferred out of the transceiver flip flop 38 to the array bus 19 in quad words (64 bits). The OE signal coupled to drivers 39 and 40 is asserted to tristate drivers 39 and 40. The transceiver flip flop 38 is turned on to transfer one quad word to the inputs of the latches 35 and 36 in 16 ns. It takes 64 ns to transfer the first block of data to the read portion 17 of the array bus 19. The DRAMs, however, take longer than 64 ns to make the next block of 256 bits of data available. Thus, there is no potential for overwriting the first block of data stored in the transceiver flip flop 38.

The second data block is latched into the transceiver flip flop 38 under the control of the control signal generated by the command decode logic and control PALs 32. It is then transferred out of the transceiver flip flop 38 to the read portion 17 of the array bus 19 in quad words.

The above-described read operation is an example of one of the memory modules 13, 14 and 15 responding to a read early command. Pursuant to a read early command, a memory module transmits data from the main memory 34 as soon as it becomes available.

For a read late command, the selected memory module performs the same initial operations of decoding the command and generating the RAS and the first CAS control signals. The difference lies in an eight ns skew introduced into the VAR CLK signal that controls the latching of the data from the main memory 34 to the transceiver flip flop 38 and transferring the data from the transceiver flip flop 38 through the output data latches 35 and 36 onto the read portion 17 of the array bus 19. Thus, there is an eight ns difference between the point during a read early cycle that data is latched and the same point during a read late cycle because of the eight ns skew in the VAR CLK signal.

Figure 4B:
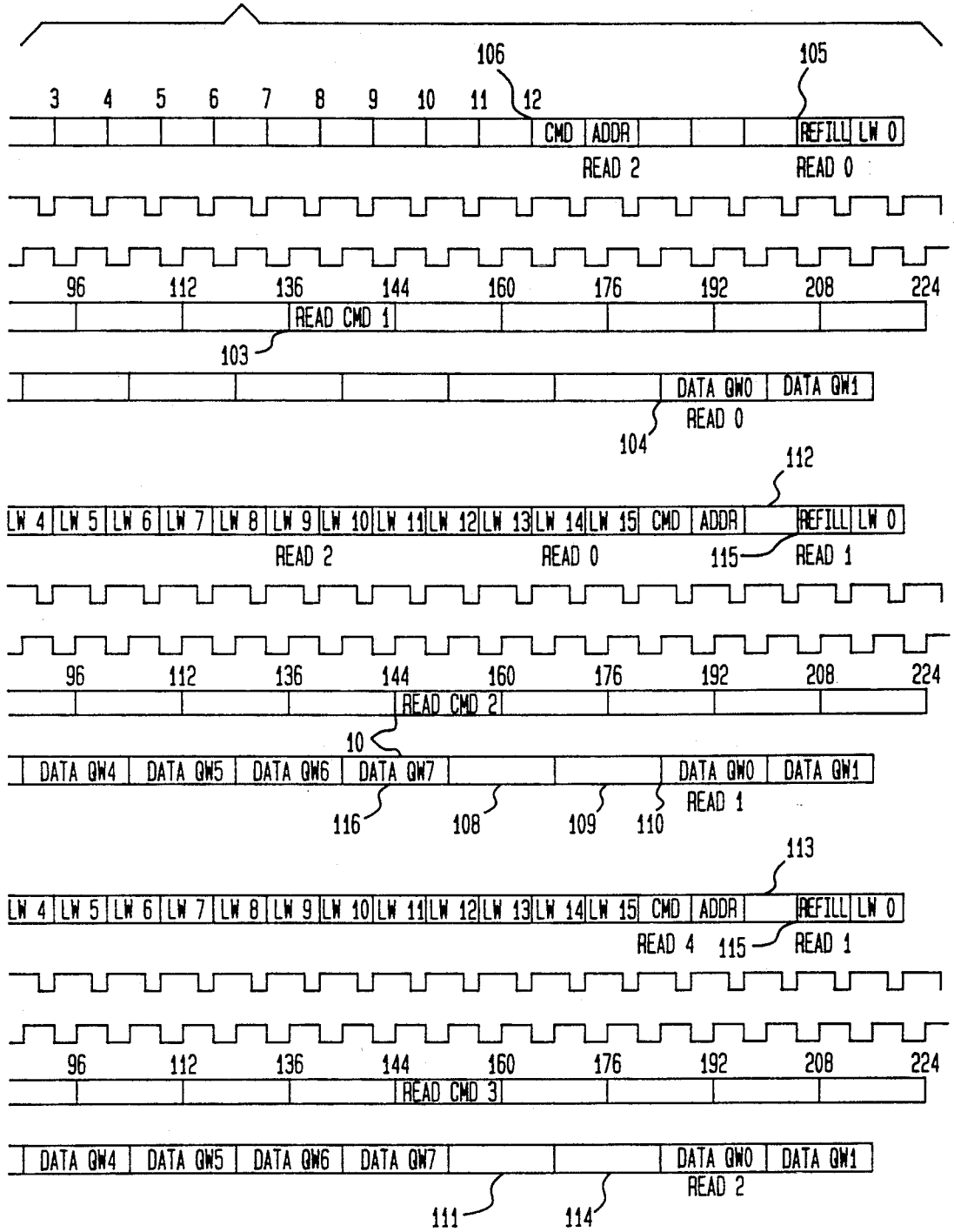
FIG. 4 consisting of FIGS. 4A and 4B shows timing diagrams that illustrate the array bus and CPU bus timing.

Referring now to FIG. 4, there is illustrated in timing diagram form, the timing of memory reads without the dynamic adjustment of the refill timing on the array bus 19. Depicted in FIG. 4 are the signals related to the CPU bus 18, CPU bus clock, an 8 ns clock, the write portion 16 and the read portion 17 of the array bus 19. The CPU clock transitions from low to high indicating the cycles of the CPU bus 18. The array bus 19 timing operates on low to high transitions of the 8 ns clock which is derived from the 4 ns clock coupled to the divide by four circuit 41. In this example, the memory controller 63 is in an idle state, the system is about to enter its busiest state, all read commands are read early commands and are directed to different memory modules. FIG. 4 demonstrates how bandwidth is wasted on the CPU bus 18 without the dynamic refill timing positioning.

As shown at point 100, a read command, Read 0, is issued from the CPU 12 during a first CPU bus 18 cycle followed by the address of the memory location to be read in the next CPU bus 18 cycle. This command and address are received by the control logic device 60, the command is passed to the command decoder 69, decoded and then passed to the next available state machine 70, 71 and 72. The available state machine, e.g., 70, formats the command into a read command, Read Cmd 0. The command is output through the output data latch 59 onto the write portion 16 of the array bus 19 at point 101 to the selected memory module, e.g., 13.

At point 102, the CPU 12 issues another read command, Read 1, along with the address of the memory location to be read. As explained above, this command and address are passed through the memory control logic device 11 and formatted into a read command, Read Cmd 1, and output through the output data latch 59 onto the write portion 16 of the array bus 19 at point 103 to the selected memory module, e.g., 14, ten array bus 19 cycles after Read Cmd 0 was issued. Nine inactive, i.e., dead cycles are inserted on the array bus 19 to allow enough time on the read portion 17 of the array bus 19 between data transfers to accommodate the CPU bus 18 overhead requirements. As discussed above, the CPU bus 18 requires a minimum of three CPU bus 18 cycles between data transfers on the CPU bus 18 to allow for a refill command, a read command and a read address to be transmitted. Thus, by delaying the issuance of Read Cmd 0 for ten array bus 19 cycles, the CPU bus 18 overhead requirements are met.

Data for Read Cmd 0 is transmitted on the read portion 17 of the array bus 19 by the selected memory module 13 starting at point 104 for eight successive array bus 19 cycles. The data is received by the 32-bit wide latch 64 and passed on to the CPU bus 18 by the control logic device 60 starting at point 105. The data received from the selected memory module 13 is in quadword format, i.e., eight bytes of data per array bus 19 cycle. This data must be transmitted to the CPU 12 in long word format, i.e., four bytes of data per CPU bus 18 cycle.

Data for Read Cmd 1 is transmitted on the read portion 17 of the array bus 19 by the selected memory module 14 starting at point 110 for eight successive array bus 19 cycles. The data is received by the latch 64 and passed on to the CPU bus 18 by the control logic device 60 starting at point 115.

As explained above, Read Cmd 1 is issued on the write portion 16 of the array bus 19 ten array bus 19 cycles after Read Cmd 0 is issued. The delay between Read Cmd 0 and Read Cmd 1 is a function of the memory read latency of the selected memory modules 13 and 14. The delay between the issuance of Read Cmd 0 and Read Cmd 1 accommodates the overhead requirements of the CPU bus 18 and obviates any bus contention problems on the array bus 19. Issuing the read commands as described above results in two dead cycles on the read portion 17 of the array bus 19 as shown at points 108 and 109 between Data QW7 at point 116 and Data QW0 at point 110.

If Read Cmd 1 was issued one cycle earlier, i.e., nine array bus 19 cycles after Read Cmd 0, there would only be one dead cycle between Data QW7 at point 116 and Data QW0 at point 110. Similarly, if Read Cmd 1 were issued two cycles earlier, i.e., eight array bus 19 cycles after Read Cmd 0, there would be no dead cycles between Data QW7 at point 116 and Data QW0 at point 110. Thus, the number of array bus 19 cycles between read commands issued on the write portion 16 of the array bus 19 directly correlates to the number of dead cycles on the read portion 17 of the array bus 19 between read data blocks.

At least one dead cycle between data transfers on the read portion 17 of the array bus 19 is required to allow an active one of the memory modules 13, 14 and 15 to release the array bus 19 before another one of the memory modules 13, 14 and 15 can utilize the array bus 19. Thus, one dead cycle on the array bus 19 is required to eliminate bus contention between the memory modules 13, 14, and 15. The CPU bus 18 overhead requires a minimum of three CPU bus 18 cycles between data reads to allow for the CPU 12 to output any pending read commands (one cycle) with an address (one cycle) and also allow the memory control logic device 11 to issue a refill command to indicate to the CPU 12 that the next block of data is ready (one cycle). Thus, a minimum of 24 ns of dead time on the read portion 17 of the array bus 19 is required to accommodate the CPU bus 18 overhead requirements and avoid bus contention on the array bus 19. To provide 24 ns of dead time, a minimum of two dead cycles, i.e., 32 ns are required between data transfers on the read portion 17 of the array bus 19. As a result, successive read commands must be issued ten array bus 19 cycles after a previous read command on the write portion 16 of the array bus 19.

The result of adding two dead cycles on the read portion 17 of the array bus 19 between each refill transfer as shown at points 108, 109 and 111, 114 is that there are dead cycles on the CPU bus 18 as shown at points 112 and 113. In equalizing the bandwidths of the CPU bus 18 and array bus 19, these four dead cycles occur on the CPU bus 18 because two dead cycles are introduced on the array bus 19 to account for the three CPU bus 18 cycles overhead. As discussed above, a CPU bus 18 cycle is eight ns and the array bus 19 cycle is 16 ns. Thus, a 32 ns delay is introduced on the array bus 19 to accommodate a 24 ns delay on the CPU bus 18. The resulting eight ns dead cycle on the CPU bus 18 represents bandwidth being wasted thereby needlessly slowing down memory read operations.

The present invention integrates the CPU bus 18 timing into the array bus 19 timing to equalize the bandwidths of the CPU bus 18 and the array bus 19 without introducing unnecessary dead cycles thereby maximizing throughput on refill, i.e., memory read operations. With refill timing positioning, the eight ns dead cycle on the CPU bus 18 between refill operations is eliminated.

Based on the foregoing, one and one half dead cycles (24 ns) instead of two dead cycles (32 ns) are utilized on the read portion 17 of the array bus 19 to equalize the bandwidths of the CPU bus 18 and the array bus 19. Since memory access speed cannot be increased, the solution is to slow down memory accesses by eight ns. Under the prior art requirements of issuing read commands ten array bus 19 cycles apart, if memory accesses are slowed down by eight ns there will be two and one half dead cycles on the read portion 17 of the array bus 19 instead of one and one half dead cycles. The present invention achieves the one and one half dead cycles between data transfers on the read portion 17 of the array bus 19 by issuing a read command, i.e., a read late command, one array bus 19 cycle earlier on the write portion 16 of the array bus 19. The read late command instructs the selected memory module to delay returning refill data for eight ns. The net effect is that data is returned by the selected memory module eight ns earlier for a total of one and one half dead cycles between data blocks on the read portion 17 of the array bus 19.

The solution, however, is not simply to issue back to back read late commands. For example, if back to back read late commands are issued ten bus 19 cycles apart on the write portion 16 of the array bus 19 there will be two dead cycles on the array bus 19 between the data returned on the read portion 17 of the array bus 19 pursuant to the back to back read late commands. One dead cycle on the array bus 19 would result between data transfers on the read portion 17 of the array bus 19 if back to back late read commands are issued nine array bus 19 cycles apart.

The present invention achieves one and one half dead cycles between memory read data transfers on the read portion 17 of the array bus 19 by utilizing two read commands. A read early command is always issued ten array bus 19 cycles after the previous command. It instructs a selected memory module to return data as soon as possible. Back to back read early commands are utilized when the array bus 19 is not in its busiest state. When the system 10 is in its busiest state, the read late command will always follow a read early command. It is issued on the write portion 16 of the array bus 19 nine array bus 19 cycles after the previous read early command. As explained above, there is one and one half dead cycles on the read portion 17 of the array bus 19 between the end of the read data block for the read early command and the beginning of the read data block for the read late command. Based on the foregoing, by toggling between read early and read late commands, the present invention equalizes the bandwidths of the CPU bus 18 and the array bus 19 when the array bus 19 is in its busiest state by maintaining one and one half dead array bus 19 cycles on the read portion 17 of the array bus 19 between memory read transfers.

The present invention accomplishes the dynamic refill timing positioning as follows. The CPU 12 transmits a memory read command and a memory address across the CPU bus 18 to the memory control logic device 11. The control logic device 60 receives the command and address and decodes the address to determine to which memory module the read is directed. Upon ascertaining the selected memory module, the control logic device 60 further ascertains the read access time, i.e., the amount of time the selected memory module requires upon receiving a read command until it starts transferring data to the memory control logic device 11. The control logic device 60 then passes the address through the latch 79 to the memory queue 74 and the read access time to an available state machine 70, 71 and 72 and the memory queue 74.

The control logic device 60 also passes the command received from the CPU 12 to the command decoder 69. Upon decoding the command, the command decoder 69 then passes this decoded command to an available, i.e., idle state machine, for example, state machine 71. After the state machine 71 detects a VLD CMD and a RD signal, it asserts the SET RD BSY and SET RD PENDING signals. The state machine 71 then examines the memory queue 74 to determine if the CMD PENDING signal is asserted indicating that there are pending reads to memory. Assuming that the CMD PENDING signal is not asserted, the state machine 71 processes the read by generating an ARRAY BUS RD signal which is passed to the bus output control logic 76 and initializing its programmable counter to track the read latency of the selected memory module. Since there are no read commands pending, the SEND READ EARLY signal passed to the bus output control logic 76 by the memory queue 74 is asserted. Thus, a read early command is selected to be transmitted on the write portion 16 of the array bus 19. The state machine 71 then tracks the amount of time that elapses from when it issued the read early command and when the data should be received through its associated programmable counter.

When the read early command is issued to the selected memory module, e.g., 13, the programmable counter in the memory queue 74 is loaded to count a "shadow" time period, i.e., the total time from the issuance of a read command by the memory controller 63 to the reception of the data related to that command by the memory controller 63. The value loaded into the counter is a function of the read access time and the type of read command issued, i.e., early or late. If another read command to another memory module is received by the memory control logic device 11 during the shadow time period, the available state machine, e.g., 72, enters state 3 and generates the NEXT RD VLD signal. This signal toggles the SEND READ EARLY signal output by the memory queue 74 to cause a read late command to be issued nine array bus 19 cycles after the read early command was issued. A read late command is issued because the SEND READ EARLY signal is deasserted thereby causing the bus output control logic 76 to select the READ LATE input of the multiplexer 77. As discussed above, the busy logic 73 prevents the control logic device 60 from passing a command from the CPU 12 to the memory controller 63 directed to the selected memory module.

The present invention provides for the read commands issued to the memory array 80 to thereafter toggle between read early and read late commands when read requests continue to be received from the CPU 12 within the shadow time period of a previously issued read command. As described above, the SEND READ EARLY signal is toggled each time a read command is received in the shadow of a previous read command. Thus, when an ARRAY BUS RD signal is generated by one of the state machines 70, 71 and 72, the state of the SEND READ EARLY signal controls the selection of the read command passed through the multiplexer 77 and output on the write portion 16 of the array bus 19. By toggling between read early and read late commands, issuing read early commands ten array bus 19 cycles after the previous read late command was issued on the array bus 19 and issuing read late commands nine array bus 19 cycles after the previous read early command was issued on the array bus 19, the present invention maintains nine and one-half array bus 19 cycles per memory read transaction on the array bus 19. Nine and one-half array bus 19 cycles are equivalent to 19 CPU bus 18 cycles, the minimum number of CPU bus 18 cycles required for a memory read transaction. Thus, the bandwidth of the array bus 19 is equalized to the maximum bandwidth of the CPU bus 18 when the array bus 19 is in its busiest state. Otherwise, if a read request is received outside of the shadow time period, the array bus 19 will not be in its busiest state, therefore, back to back read early commands are issued. There is no need to optimize the bandwidths of the CPU bus 18 and the array bus 19 in the non-busy situation.

Refer to FIG. 5 for a full description of the implementation of the dynamic refill positioning by the present invention. FIG. 5 is a timing diagram which depicts signals relating to the CPU bus 18, the CPU bus clock, the 8 ns clock, the write portion 16 and the read portion 17 of the array bus 19. In this example, the memory controller 63 is in an idle state, the system is about to enter its busiest state and each read command is directed to a different memory module.

A number of read commands are issued by the CPU 12 on the CPU bus 18 as shown at points 140, 141 and 142. Upon receiving the first read command, Read 0, the control logic device 60 passes the command to the command decoder 69, the command is decoded and then passed to the next available state machine 70, 71 and 72. The next available state machine, e.g., 70, sequences through the requisite states as discussed above to cause the command to be issued as a read early command on the write portion 16 of the array bus 19 as shown at point 143. The programmable counter in the memory queue 74 is loaded upon issuance of this command to begin the tracking of the shadow time period for the read early command. This shadow time period is a function of the read access time of the selected memory module, e.g., 13, and the type of read command issued.

At point 141, the CPU 12 issues a second read command within the shadow time period of the read early command issued at point 143. Thus, the available state machine, e.g, state machine 71, upon commencing execution, detects the CMD PENDING signal is asserted. The state machine 71 generates the NEXT RD VLD signal thereby toggling the state of the SEND READ EARL signal output by the memory queue 74, and loops in state 3 until the CMD PENDING signal is deasserted. Upon the deassertion of the CMD PENDING signal, the state machine 71 sequences through the requisite states to cause the second read command to be issued. This command is issued as a read late command at point 144 pursuant to the SEND READ EARLY signal output by the memory queu 74 being deasserted. This read late command is issued at point 144 nine array bus 19 cycles after the memory control logic device 11 issued the read early command at point 143.

The data for the first CPU 12 read command, Read 0, is available on the read portion 17 of the array bus 19 at point 146. Before this point, state machine 70 was looping in state 1 waiting for its counter to generate the OVF signal indicating that read data will be received from the selected memory module 13. When the OVF signal is asserted, the state machine 70 turns on the latch 64 to capture the data from the read portion 17 of the array bus 19 and issues a CPU BUS REQ signal indicating it needs the CPU bus 18 in two CPU bus 18 cycles. As shown at point 147, the state machine 70 causes the refill command to be issued on the CPU bus 18 followed by the requested data for 16 successive bus cycles.

Issuing the read late command at point 144 results in data becoming available on the read portion 17 of the array bus 19 at point 148 one and one-half array bus 19 cycles after Data QW7 for the read early command issued at point 143 is on the read portion 17 of the array bus 19. One and one-half dead cycles, i.e., 24 ns, the minimum required to allow for CPU overhead, have been inserted on the array bus 19 to equalize its bandwidth to the bandwidth of the CPU bus 18 as shown at point 149 and 151.

The data from the selected memory module, e.g., 14, for the read late command at point 144 is transmitted by the memory module 14 at point 148, one and one-half array bus 19 cycles after the completion of the data transmission pursuant to the first early read command issued at point 143 by the selected memory module 13. Similarly, the data from a selected memory module, e.g., 15, at point 150 that was requested by a read early command issued at point 145 is transmitted one and one-half array bus 19 cycles after the data from the read late command issued at point 144 has been received by the memory control logic device 11 on the read portion 17 of the array bus 19.

Comparing FIG. 4 to FIG. 5, it is apparent that by toggling between read early and read late commands, the present invention equalizes the bandwidths of the CPU bus 18 and the array bus 19 without wasting bandwidth on the CPU bus 18. As discussed above, in FIG. 4, two dead cycles, i.e., 32 ns are introduced between data read transfers on the array bus 19 when the dynamic refill positioning of the present invention is not utilized as shown at points 108, 109 and 111, 114. This results in one cycle, i.e., eight ns of wasted bandwidth on the CPU bus 18 as shown at points 112 and 113. The present invention eliminates the wasted bandwidth on the CPU bus 18 by introducing only one and one-half dead cycles on the read portion 17 of the array bus 19 between memory reads thereby absorbing one cycle of wasted bandwidth on the CPU bus 18 between refill transmissions. Thus, instead of one CPU bus 18 cycle gaps appearing on the CPU bus 18 between refill transmissions as shown at points 112 and 113 in FIG. 4, there are no gaps between refill transmissions on the CPU bus 18 after the first refill transmission is commenced as shown at point 147 to point 152 in FIG. 5.

The state machines 70, 71 and 72 control the latch 64 receiving data from the read portion 17 of the array bus 19 at eight ns boundaries. This latch 64 is opened only when refill data is valid at its input. The active one of the state machines 70, 71 and 72 notifies the control logic device 60 ahead of time of an incoming refill since it has complete knowledge of when data will return from the read portion 17 of the array bus 19. The control logic device 60 gives refills highest priority, therefore, as soon as the refill data is received in the latch 64, it spends an eight ns cycle through the error detection and correction logic 65 and then is transmitted to the control logic device 60 for transmission on the CPU bus 18. Because the CPU bus 18 runs on an eight ns cycle time, it does not matter how many dead cycles were introduced on the array bus 19 side.

The above described embodiment of the invention is meant to be representative only, as certain changes may be made therein without departing from the clear teachings of the invention. Accordingly, reference should be made to the following claims which alone define the invention.

What is claimed:

1. A method for equalizing bandwidths of a first bus and a second bus in a computer system, the first bus having a first bandwidth and a first bus cycle time, the second bus having a second bandwidth and a second bus cycle time, the computer system including a central processing unit coupled to the first bus, a control logic device intercoupled between the first bus and the second bus and a device coupled to the second bus, comprising the steps of:
   a) operating the central processing unit to transmit a first read command on the first bus to the control logic device;
   b) operating the control logic device to transmit on the second bus to the device the first read command as a second read command representative of the first read command;
   c) operating the control logic device to track the amount of time before data is expected to be received by the control logic device from the device on the second bus pursuant to the second read command;
   d) operating the central processing unit to transmit a third read command on the first bus to the control logic device before the time has expired that data is expected to be received by the control logic second read command;
   e) operating the device to transmit a first read data block on the second bus to the control logic device in response to the second read command;
   f) operating the control logic device to transmit the third read command as a fourth read command representative of the third read command on the second bus to the device a preselected number of second bus cycle times after the transmission of the second read command;
   g) operating the device to transmit a second read data block on the second bus to the control logic device in response to the fourth read command;
   h) operating the control logic device to receive the first read data block from the second bus and transmit the first read data block on the first bus to the central processing unit;
   i) operating the control logic device to receive the second read data block from the second bus a preselected number of first bus cycle times after the first read data block has been received on the second bus; and
   j) operating the control logic device and the device to control the preselected number of second bus cycle times and the times between transmitting the second and fourth read commands and transmitting the first and second read data blocks, to cause the second read data block to be:
      (i) transmitted by the device on the second bus pursuant to the fourth read command the preselected number of first bus cycle times after the first read data block is received on the second bus pursuant to the second read command, and
      (ii) transmitted by the control logic device on the first bus in a next first bus cycle time after completing the transmission of the first read data block on the first bus,
   thereby reducing the second bandwidth of the second bus to equal the first bandwidth of the first bus.

2. The method of claim 1 wherein two read commands are available and the step of operating the control logic device to transmit the first read command as a second read command includes the step of operating the control logic device to decode the first read command and operating the control logic device to issue a specific one of two read commands dependent upon the loading conditions of the second bus.

3. The method of claim 1 wherein two read commands are available and the step of operating the control logic device to transmit the third read command as a fourth read command includes the step of operating the control logic device to decode the third read command and operating the control logic device to issue a specific one of two read commands dependent upon the loading conditions of the second bus.

4. The method of claim 1 further comprising the steps of:
   (a) operating the control logic device to track the amount of time before data is expected to be received by the control logic device from the device on the second bus pursuant to the fourth read command;
   (b) operating the central processing unit to transmit a fifth read command on the first bus to the control logic device before the time has expired that data is expected to be received by the control logic device from the device on the second bus pursuant to the fourth read command;
   (c) operating the control logic device to transmit the fifth read command as a sixth read command representative of the fifth read command on the second bus to the device a second preselected number of second bus cycle times after the transmission by the control logic device of the fourth read command;

(d) operating the device to transmit a third read data block on the second bus to the control logic device in response to the sixth read command;

(e) operating the control logic device to receive the third read data block on the second bus the preselected number of first bus cycle times after the second read data block has been received by the control logic device; and (f) operating the control logic device and the device to control the second preselected number of second bus cycles times and the times between transmitting the fourth and sixth read commands and transmitting the second and third read data blocks, to cause the third read data block to be:

(i) transmitted by the device on the second bus pursuant to the sixth read command the preselected number of first bus cycle times after the second read data block is received pursuant to the second read command, and (ii) transmitted by the control logic device on the first bus in a second next first bus cycle time after completing the transmission of the second read data block on the first bus, thereby reducing the second bandwidth of the second bus to equal the first bandwidth of the first bus.

5. The method of any one of claims 1 or 4 wherein the first bandwidth is less than the second bandwidth.

6. The method of claim 4 wherein two read commands are available and the step of operating the control logic device to transmit the fifth read command as a sixth read command includes the step of operating the control logic device to decode the fifth read command and operating the control logic device to issue a specific one of two read commands dependent upon the loading conditions of the second bus.

7. A method for equalizing bandwidths of a first bus and a second bus in a computer system, the first bus having a first bandwidth and a first bus cycle time, the second bus having a second bandwidth and a second bus cycle time, the computer system including a central processing unit coupled to the first bus, a control logic device intercoupled between the first bus and the second bus and a device coupled to the second bus, comprising the steps of:

a) operating the central processing unit to transmit a first read command on the first bus to the control logic device;

b) operating the control logic device to transmit on the second bus to the device the first read command as a read early command having a first shadow time period;

c) operating the control logic device to track the first shadow time period of the read early command transmitted by the control logic device;

d) operating the central processing unit to transmit a second read command on the first bus to the control logic device;

e) operating the control logic device to transmit on the second bus to the device the second read command as a read late command having a second shadow time period a preselected number of second bus cycle times after transmitting the read early command on the second bus to the device when the second read command is transmitted on the first bus by the central processing unit within the first shadow time period;

f) operating the control logic device to track the second shadow time period of the read late command;

g) operating the device to transmit a first read data block on the second bus to the control logic device in response to the read early command;

h) operating the control logic device to receive the first read data block from the device on the second bus and to transmit the first read data block on the first bus to the central processing unit;

i) operating the device to transmit a second read data block on the second bus to the control logic device in response to the read late command;

j) operating the control logic device to receive the second read data block from the device on the second bus a preselected number of first bus cycle times after the first read data block has been received on the second bus by the control logic device;

k) operating the control logic device and the device to control the preselected number of second bus cycle times and the times between operating the control logic device to transmit the read early and read late commands and operating the device to transmit the first read data block, to cause the second read data block to be: (i) transmitted by the device on the second bus the preselected number of first bus cycle times after the first read data block is received by the control logic device from the second bus, and (ii) transmitted by the control logic device on the first bus to the central processing unit in a next first bus cycle time after completing the transmission of the first read data block on the first bus from the control logic device to the central processing unit and, thereby reducing the second bandwidth of the second bus to equal the first bandwidth of the first bus; and l) repeating steps (a)–(k) until a read command transmitted by the central processing unit on the first bus is received by the control logic device outside the shadow time period of a last transmitted read late or read early command.

8. The method of claim 7 wherein the first preselected number of second bus cycle times equals nine second bus cycle times.

9. The method of claim 7 wherein the second preselected number of second bus cycle times equals ten second bus cycle times.

10. The method of claim 17 wherein the preselected number of first bus cycle times equals three first bus cycle times.

11. The method of claim 7 wherein the first bandwidth is less than the second bandwidth.

12. The method of claim 11 wherein the second bus cycle time is twice the first bus cycle time.

13. The method according to claim 7 wherein the device is a memory module having the second read data block stored in a portion of a plurality of locations, wherein after the step of operating the control logic device to transmit the second read command on the second bus as a read late command, further comprising the steps:

(a) operating the memory module to receive the read late command from the second bus;

(b) operating the memory module to decode the read late command to ascertain the type of command received by the memory module;

(c) operating the memory module to access the second read data block stored in the memory model;

(d) operating the memory module to delay the transmission of the second read data block on the second bus for a second preselected first bus cycle time pursuant to the read late command.

14. The method of claim 13 wherein the second preselected first bus cycle time equals one first bus cycle time.

15. A method for equalizing bandwidths of a first bus and a second bus in a computer system, the first bus having a first bandwidth, a first bus cycle time, and a first bus overhead requirement, the second bus having a second bandwidth and a second bus cycle time, wherein the first bandwidth is less than the second bandwidth, the computer system including a central processing unit coupled to the first bus, a control logic device intercoupled between the first bus and the second bus and a device coupled to the second bus, comprising the steps of:

a) operating the central processing unit to transmit on the first bus to the control logic device a first rad command and a first address in two consecutive first bus cycle times;

b) operating the control logic device to transmit on the second bus to the device a read early command representative of the first read command having a first shadow time period and an address in one second bus cycle time;

c) operating the control logic device to track the first shadow time period of the read early command;

d) operating the central processing unit to transmit on the first bus to the control logic device a second read command and a second address in two consecutive first bus cycle times;

e) operating the control logic device to transmit on the second bus to the device a read late command representative of the second read command having a second shadow time period and an address in one second bus cycle time a preselected number of second bus cycle times after transmitting the read early command when the second read command is transmitted on the first bus by the central processing unit within the first shadow time period;

f) operating the control logic device to track the second shadow time period of the read late command;

g) operating the device to transmit to the control logic device on the second bus a first read data block in response to the read early command;

h) operating the control logic device to transmit to the central processing unit on the first bus a first refill command in a first bus cycle time when the first shadow time period expires;

i) operating the control logic device to receive from the device on the second bus the first read data block and to transmit the first read data block on the first bus to the central processing unit starting in a first bus cycle time immediately after transmitting the first refill command;

j) operating the device to transmit on the second bus to the control logic device a second read data block in response to the read late command;

k) operating the control logic device to transmit on the first bus to the central processing unit a second refill command in a second first bus cycle time immediately after completing the transmission of the first read data block on the first bus when the second shadow time period expires;

l) operating the control logic device to receive from the device on the second bus the second read data block a preselected number of first bus cycle times after the first read data block has been received on the second bus by the control logic device; and m) operating the control logic device and the device to control the preselected number of second bus cycle times and the times between transmitting the read early and read late commands and transmitting the first and second read data blocks, to cause the second read data block to be:

(i) transmitted by the device on the second bus the preselected number of first bus cycle times after the first read data block is received by the control logic device from the second bus, and (ii) transmitted by the control logic device on the first bus in a third first bus cycle time immediately after transmitting the second refill command such that the first bus continually transmits data in each one of the first bus cycle times after transmitting the first refill command, thereby reducing the second bandwidth of the second bus to equal the first bandwidth of the first bus.

16. The method according to claim 15, further comprising the steps of:

(a) operating the central processing unit to transmit on the first bus to the control logic device a plurality of read commands and addresses, each one of the plurality of read commands being transmitted at random intervals; and (b) operating the control logic device to toggle between the transmission of read early and read late commands representative of the plurality of read commands on the second bus to the device, each one of the read early and read late commands having a shadow time period, by:

(i) transmitting a read early command when one of the plurality of read commands is transmitted on the first bus by the central processing unit within a shadow time period of a prior one of the plurality of read commands transmitted on the second bus by the control logic device as a read late command, and (ii) transmitting a read late command when one of the plurality of read commands is transmitted on the first bus by the central processing unit within a shadow time period of a second prior one of the plurality of read commands transmitted on the second bus by the control logic device as a read early command.

17. The method according to claim 16 wherein the first bus overhead requirement equals three first bus cycle times, the three first bus cycle times comprising a command, an address and a refill command.

18. The method according to claim 16 wherein the preselected number of second bus cycle times equals nine second bus cycle times.

19. The method according to claim 16 wherein the preselected number of first bus cycle times equals the first bus overhead requirement.

20. The method according to claim 16 wherein the device is a memory module having the second read data block stored in a portion of a plurality of locations, wherein after the step of operating the control logic device to transmit on the second bus the second read command as a read late command, further comprises the steps:
- (a) operating the memory module to receive the read late command from the second bus;
- (b) operating the memory module to decode the read late command to ascertain the type of command received by the memory module;
- (c) operating the memory module to access the second read data block stored in the memory module;
- (d) operating the memory module to delay the transmission of the second read data block on the second bus for a second preselected first bus cycle time pursuant to the read late command.

21. The method of claim 16 wherein the second preselected first bus cycle time equals one first bus cycle time.

22. A computer system comprising:
- (a) a first bus having a first bandwidth and a first bus cycle time;
- (b) a second bus having a second bandwidth and a second bus cycle time;
- (c) a memory control logic device intercoupling the first bus and the second bus adapted to receive and decode read commands from the first bus and adapted to monitor the activity on the second bus and to issue a plurality of read command types on the second bus depending on whether the memory control logic device is waiting for a response to an issued one of the plurality of read command types, the memory control logic device including means for issuing each one of the plurality of read command types onto the second bus a preselected number of second bus cycle times apart; and
- (d) a memory module coupled to the second bus adapted to decode the plurality of read command types received from the memory control logic device on the second bus and delay the starting of the transmission of a read data block onto the second bus a preselected number of second bus cycle times depending upon which one of the plurality of read command types is decoded, wherein the memory module comprises:
  - (i) a memory device having a plurality of locations, each having and address, a read data block stored in a portion of the plurality of locations, data inputs and outputs, control inputs and address input,
  - (ii) an input state device having inputs coupled to a bus having a bus cycle time for receiving commands and an address, and outputs coupled to the address inputs of the memory device,
  - (iii) command decode and control logic having inputs coupled to the outputs of the input state device for decoding the command to ascertain the type of read command received and outputs coupled to the control inputs of the memory device providing control signals to cause the memory device to make the read data block stored in the locations addressed available at the data outputs of the memory device, and
  - (iv) a bidirectional state device intercoupled between the memory device and the bus, having control inputs coupled to the command decode and control logic outputs that provide control signals to cause the bidirectional state device to capture the read data block available at the data outputs of the memory device and delay transmitting the read data block for a preselected number of bus cycle times.

23. A computer system comprising:
- (a) a central processing unit adapted to issue read commands;
- (b) a first bus having a first bandwidth and a first bus cycle time, coupled to the central processing unit;
- (c) a second bus having a second bandwidth and a second bus cycle time;
- (d) a memory control logic device intercoupling the first and the second bus, adapted to receive read commands issued by the central processing unit across the first bus, decode the received read commands and issue a plurality of read command types across the second bus depending on whether the memory control logic device is waiting for a response to an issued one of the plurality of read command types; and
- (e) a memory module coupled to the second bus adapted to decode the plurality of read command types received from the memory control logic device and delay the transmission of data requested by each one of the plurality of read command types for a preselected number of second bus cycle times, wherein the memory module comprises:
  - (i) a memory device having a plurality of locations, each having an address, a read data block stored in a portion of the plurality of locations, data inputs and outputs, control inputs and address inputs;
  - (ii) an input state device having inputs coupled to a bus having a bus cycle time for receiving commands and an address, and outputs coupled to the address inputs of the memory device;
  - (iii) command decode and control logic having inputs coupled to the outputs of the input state device for decoding the command to ascertain the type of read command received and outputs coupled to the control inputs of the memory device providing control signals to cause the memory device to make the read data block stored in the locations addressed available at the data outputs of the memory device, and
  - (iv) a bidirectional state device intercoupled between the memory device and the bus, having control inputs coupled to the command decode and control logic outputs that provide control signals to cause the bidirectional state device to capture the read data block available at the data outputs of the memory device and delay transmitting the read data block for a preselected number of bus cycle times.

24. A memory module comprising:
- (a) a memory device having a plurality of locations, each having an address, a read data block stored in a portion of the plurality of locations, data inputs and outputs, control inputs and address inputs;
- (b) an input state device having inputs coupled to a bus having a bus cycle time for receiving commands and an address, and outputs coupled to the address inputs of the memory device;
- (c) command decode and control logic having inputs coupled to the outputs of the input state device for decoding the command to ascertain the type of read command received and outputs coupled to the control inputs of the memory device providing control signals to cause the memory device to make the read data block stored in the locations addressed available at the data outputs of the memory device;

a bidirectional state device intercoupled between the memory device and the bus, having control inputs coupled to the command decode and control logic outputs that provide control signals to cause the bidirectional state device to capture the read data block available at the data outputs of the memory device and delay transmitting the read data block for a preselected number of bus cycle times.

25. The memory module according to claim 24 wherein the read command is a read late command.

26. The memory module according to claim 24 wherein the preselected number of bus cycle times equal one-half bus cycle time.

* * * * *